United States Patent [19]
Bourguet

[11] Patent Number: 5,397,173
[45] Date of Patent: Mar. 14, 1995

[54] ELECTRO-HYDRAULIC BRAKING SYSTEM FOR THE WHEELS OF AN AIRCRAFT

[75] Inventor: Vincent Bourguet, Savigny-sur-Orge, France

[73] Assignee: Messier-Bugatti, Velizy Villacoublay, France

[21] Appl. No.: 207,178

[22] Filed: Mar. 8, 1994

[30] Foreign Application Priority Data

Mar. 8, 1993 [FR] France ................... 93 02640

[51] Int. Cl.6 .................. B60T 11/21; B64C 25/46
[52] U.S. Cl. .................... 303/2; 188/106 P; 244/111; 303/113.5
[58] Field of Search ............ 303/10, 11, 95, 103, 303/113.5, 2, 3, 9, 9.63, 13–17, 20, 92, 111, 113.1, DIG. 3, DIG. 4

[56] References Cited

U.S. PATENT DOCUMENTS

| | | | |
|---|---|---|---|
| 3,926,479 | 12/1975 | Bissell et al. | 303/20 X |
| 4,640,475 | 2/1987 | Zoerb | 244/111 |
| 4,685,748 | 8/1987 | Zoerb | 244/111 X |
| 4,792,192 | 12/1988 | Tveitane | 303/DIG. 3 X |
| 4,834,465 | 5/1989 | Guichard et al. | 303/3 X |
| 4,923,056 | 5/1990 | Nedelk | 244/111 X |
| 5,024,491 | 6/1991 | Pease et al. | 303/93 |
| 5,050,940 | 9/1991 | Bedford et al. | 244/111 X |

FOREIGN PATENT DOCUMENTS

| | | |
|---|---|---|
| 0443213 | 8/1991 | European Pat. Off. . |
| 2038801 | 12/1970 | France . |
| 2608987 | 12/1986 | France . |
| 1118020 | 11/1961 | Germany . |
| 9111352 | 8/1991 | WIPO . |

*Primary Examiner*—Robert J. Oberleitner
*Assistant Examiner*—Alfred Muratori
*Attorney, Agent, or Firm*—Sixbey, Friedman, Leedom & Ferguson

[57] ABSTRACT

The invention relates to an electro-hydraulic braking system for the wheels of aircraft landing gear. The system comprises two hydraulic pressure sources each feeding a hydraulic circuit that leads to the brakes of two groups of wheels via a single braking control stage. A circuit connects either a solenoid valve electrically controlled by the control unit or else a double metering valve mechanically controlled by the brake pedals via two shuttle valves, to one inlet of each control stage. A second circuit directly connects a solenoid valve to a second inlet of each of said control stages. Each control stage includes two symmetrical internal circuits having one servo-valve per corresponding brake, which servo-valves are cross-connected by means of a respective corresponding controlled valve. In the event of one of the circuits breaking down, the servo-valves associated with the other circuit then serve, after automatic reconfiguration, also to provide braking and anti-skid control in a paired tandem mode.

10 Claims, 5 Drawing Sheets

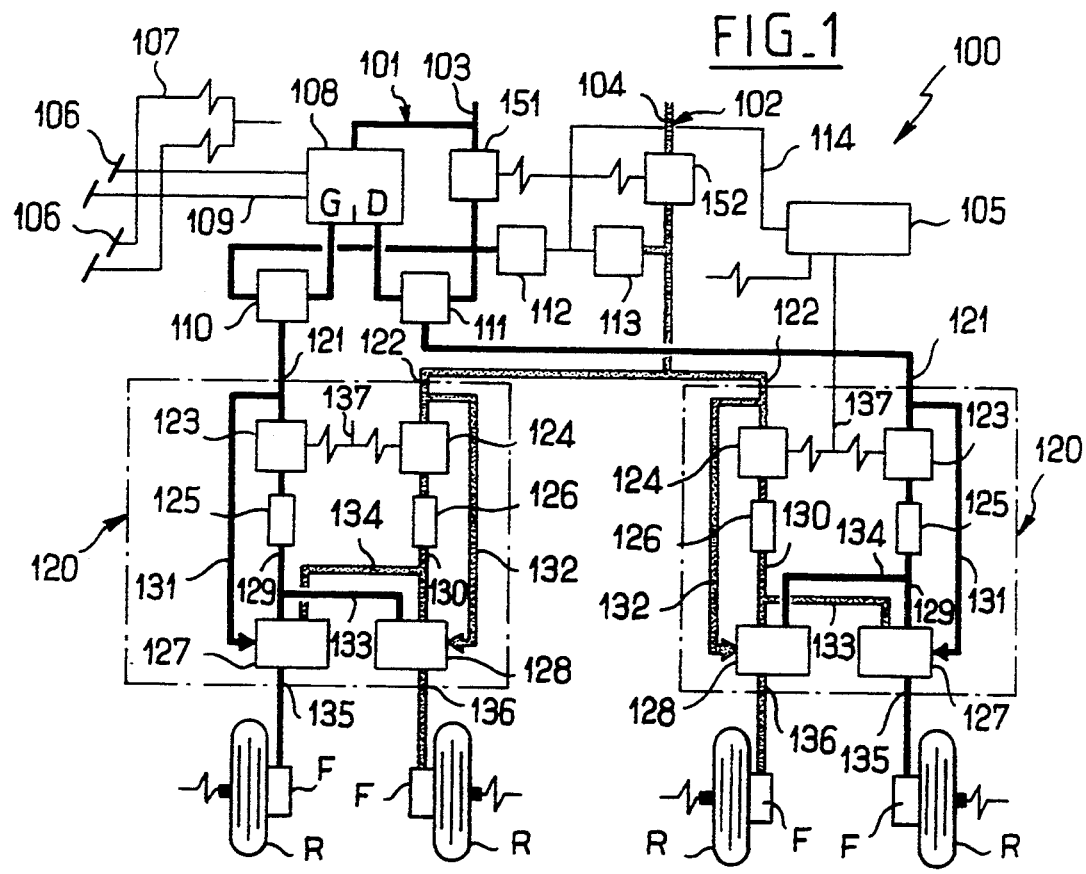
FIG_1
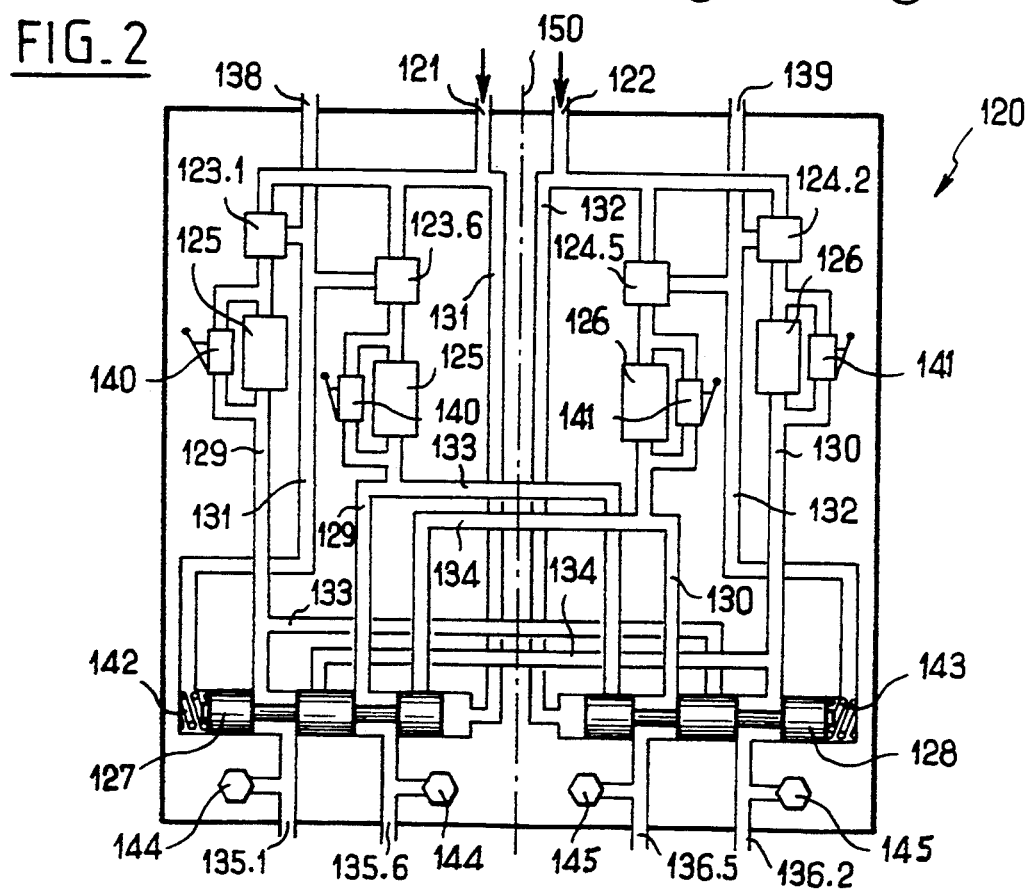
FIG_2

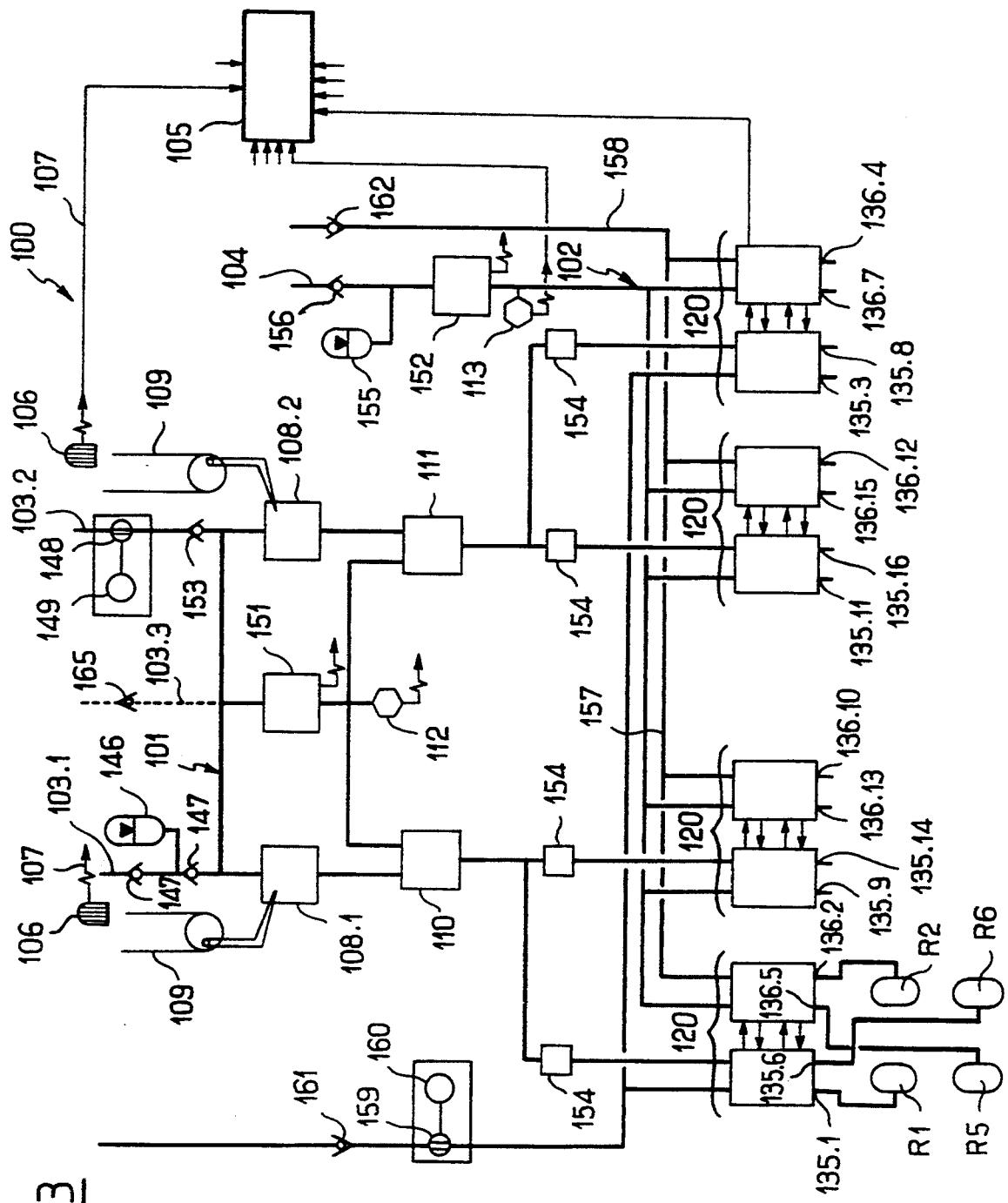
FIG_3

FIG_4a
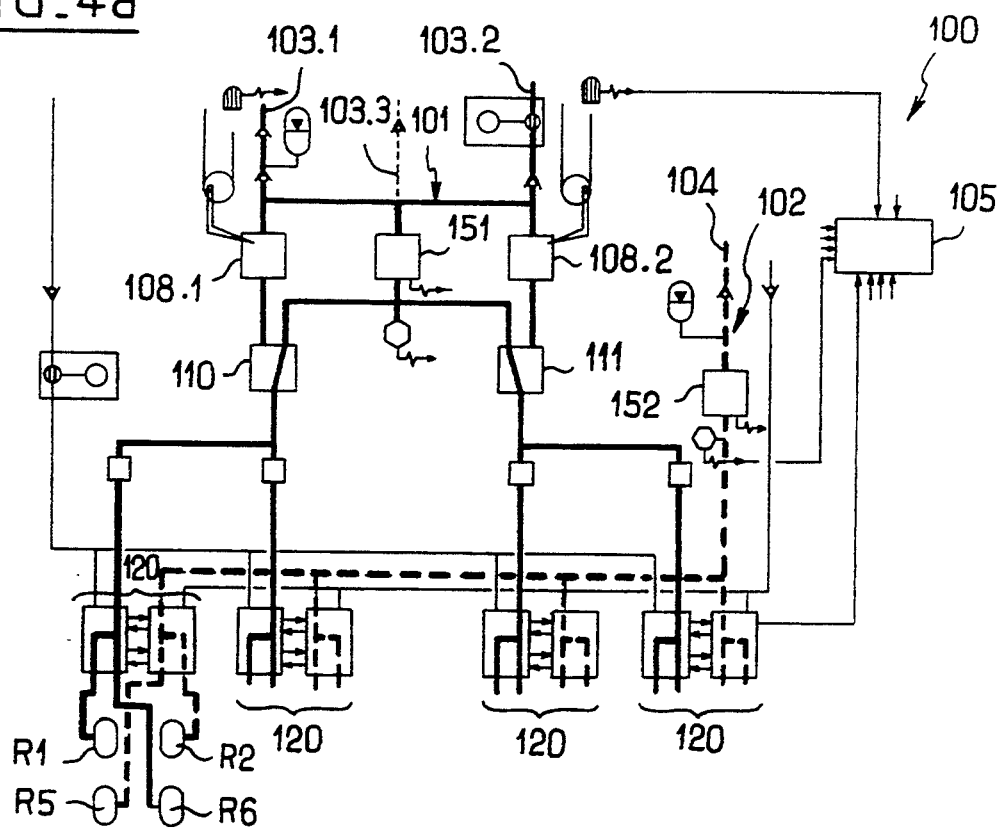
FIG_4b
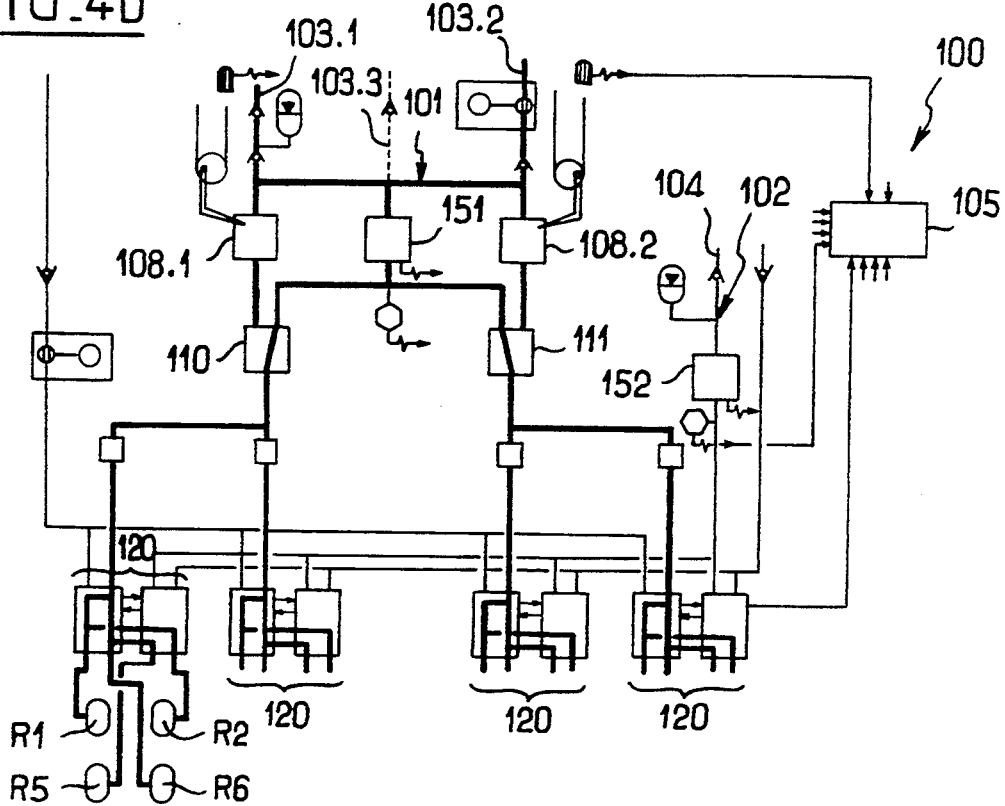

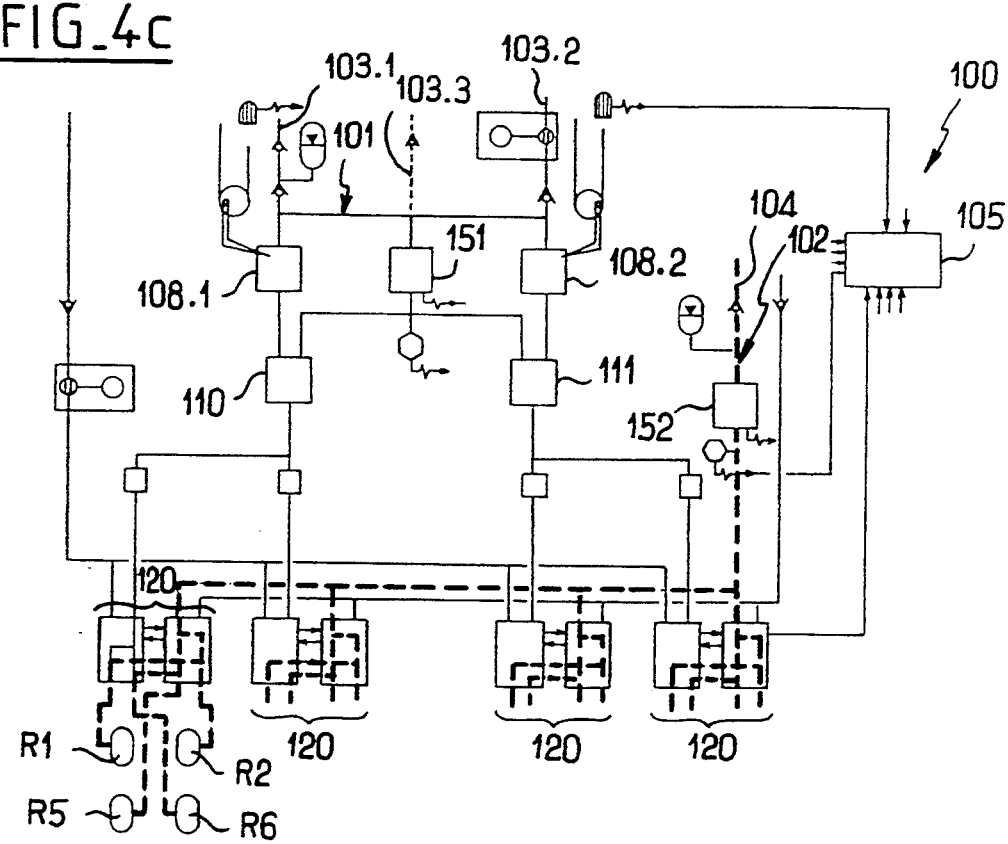
FIG_4c
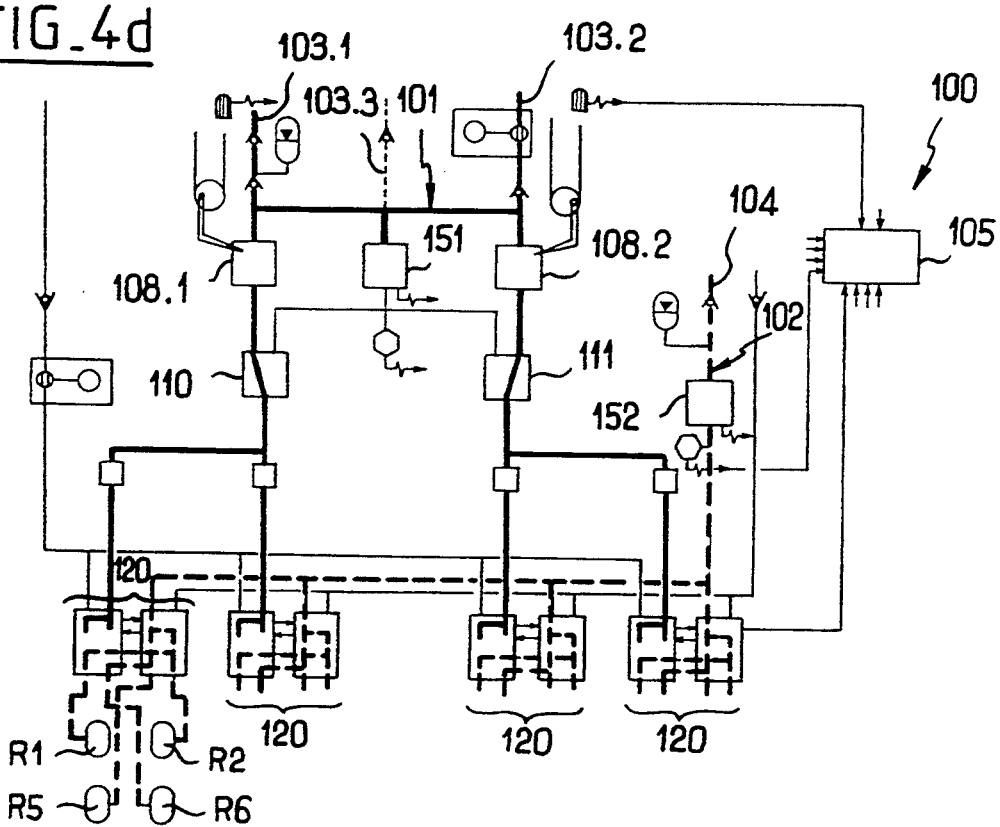
FIG_4d

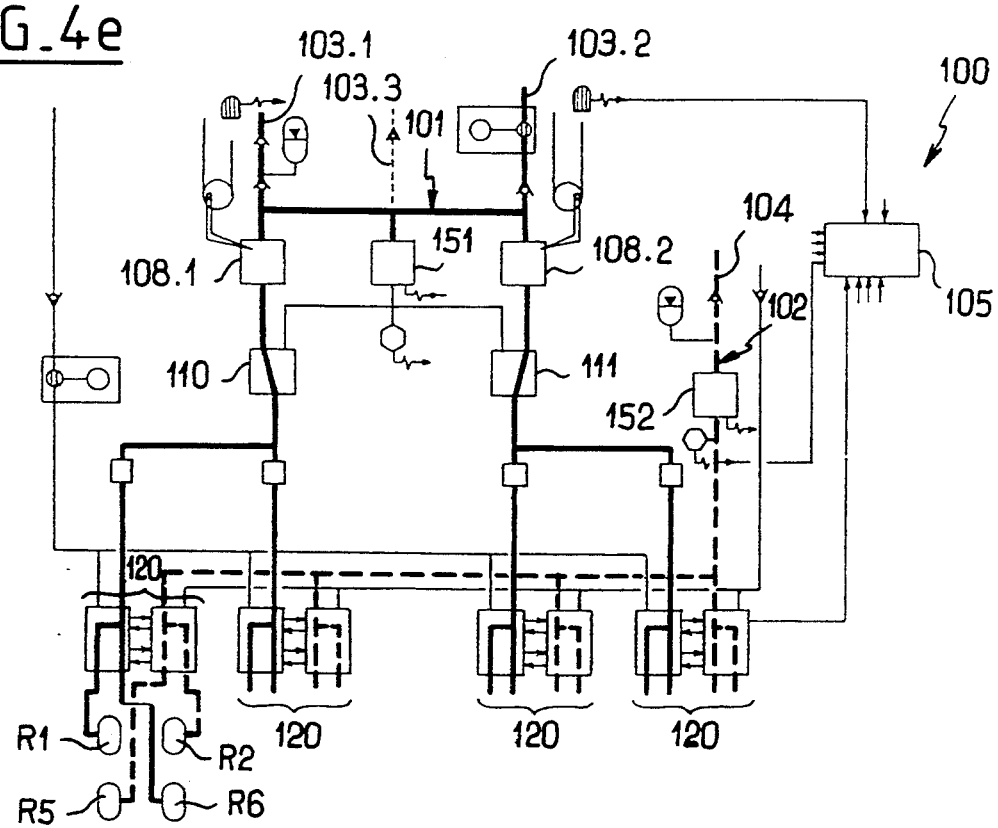
FIG._4e
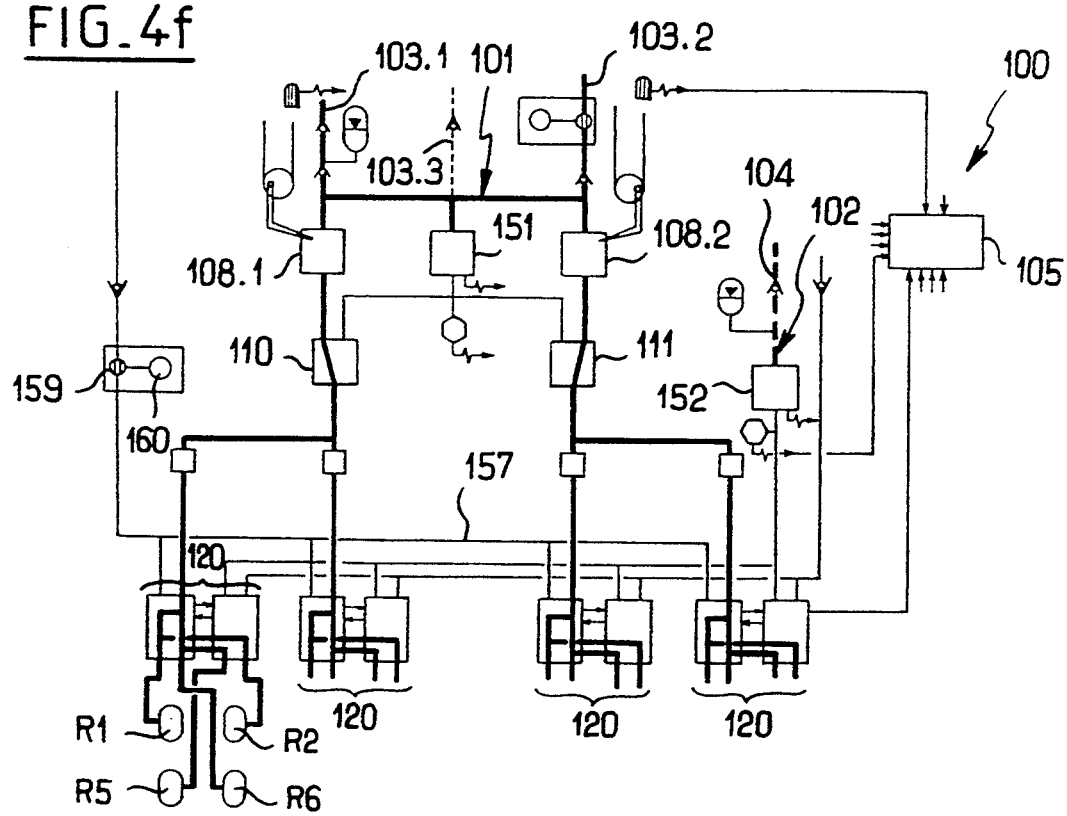
FIG._4f

ELECTRO-HYDRAULIC BRAKING SYSTEM FOR THE WHEELS OF AN AIRCRAFT

FIELD OF THE INVENTION

The present invention relates to controlled braking of the wheels in aircraft landing gear, and more particularly an electrohydraulic braking system for the wheels of aircraft landing gear in which the wheels are distributed in two groups disposed symmetrically on either side of the longitudinal midplane of the aircraft, each wheel being fitted with a brake that is actuated from brake pedals, via an associated braking and anti-skid servo-valve electrically controlled by a control unit that obtains measurement data corresponding to the depression of said pedals and to the speed of the wheel.

BACKGROUND OF THE INVENTION

Numerous braking systems already exist that are fitted with a hydraulic circuit that is used when conditions are normal, and with an emergency hydraulic circuit powered by a different source of hydraulic pressure that takes over in the event of a breakdown.

In a first example, a mechanical-hydraulic braking system is provided in which the two sources of hydraulic pressure are applied to an upstream selector that is provided to perform automatic switching. In this context, reference may be made to the following documents: U.S. Pat. No. 5,024,491 and U.S. Pat. No. 3,926,479. Downstream from the automatic selector, there are two separate hydraulic circuits, with a normal circuit that connects a first double metering valve to the wheel brakes via respective servo-valves associated with each brake and under electrical control of the control unit, and with an emergency circuit connecting a second double metering valve to the wheel brakes via associated shuttle valves. The two metering valves are actuated directly by the brake pedals via associated rodding. The presence of shuttle valves provided on the emergency circuit may differ depending on the type of brake used. With two-cavity brakes, each servo-valve of the normal circuit feeds a half-brake of the corresponding wheel, and each servo-valve of the emergency circuit feeds the other half-brake of the associated pair of wheels (left or right), whereas with single cavity brakes the emergency circuit connects the corresponding double metering valve to pairs of wheels (left or right) via servo-valves (controlled by the control unit) associated with respective pairs of wheels, and the shuttle valves of the emergency circuit may be integrated in the brakes. In this context, reference may be made to the document EP-A-0 443 213 where an organization of that type for a pair of wheels is described, and in which control is specially designed to increase the lifetime of brakes having carbon disks.

The drawback of such a system lies in its inflexibility in use, due mainly to the automatic upstream selector, making it impossible to take maximum advantage of the redundancy provided in the circuit. This selector always give precedence to the normal circuit over the emergency circuit because it compares the hydraulic pressure in the normal circuit with a predetermined percentage of nominal pressure. Consequently, a breakdown occurring downstream from the selector is not "seen" by the automatic selector, so the emergency circuit is not engaged under such circumstances. Further, since the pilot cannot choose between the normal circuit and the emergency circuit, the emergency circuit cannot be used to obtain extra braking power, such that for parking purposes it is necessary to provide a third hydraulic circuit connected to the pressure source of the emergency circuit and connecting a mechanically controlled metering valve to the shuttle valves of the emergency circuit. Furthermore, in the event of a minor breakdown on the normal circuit (e.g. misfunction of a servo-valve that also performs the anti-skid function), the computer in the control unit issues a warning signal, but the only option available to the pilot for countering the breakdown is to make use of the parking brake.

A second example is known in which the normal circuit and the emergency circuit are organized similarly to the example described above, except insofar as both circuits terminate at shuttle valves associated with each wheel brake. The controls are organized differently in that the brake pedals are connected to the two double metering valves not by rodding, but by master cylinders that control pressure: brake control is thus of the hydro-hydraulic type. That system is easier to install than the preceding system, and it avoids the need to balance tensions in cabling. Furthermore, electrical control enables the pilot to act directly on the automatic selector, enabling the emergency circuit to be used whenever desired. However, that action can only be taken under the direct control of the pilot, and is therefore necessarily subject to error in that it may be taken too late and/or under conditions that are unsuitable, and this is all the more likely in that the pilot may well be coping simultaneously with other problems (e.g. a fire in one of the engines): the risk of human error therefore penalizes that type of system.

A third example is known that constitutes a combination, having an emergency circuit that is controlled hydro-hydraulically by means of master cylinders (as in the second example), but in association with a normal circuit that is controlled electro-hydraulically and that additionally includes a solenoid valve (ON/OFF valve) provided upstream from the automatic selector: if the solenoid valve is off, then the selector switches automatically to the emergency circuit. The emergency circuit is then the only circuit to be fitted with a double metering valve connected to the brake pedals by means of master cylinders. A system of that type is illustrated in document FR-A-2 608 987 (& U.S. Pat. No. 4,834,465) in the name of the Applicant. That system thus has the advantage of being more flexible than the preceding systems since, in the event of a breakdown, the computer of the control unit can switch automatically to the emergency circuit, thereby taking better advantage of the redundancy provided in the circuits. Nevertheless, the above-mentioned drawbacks inherent to the presence of the upstream selector remain. In addition, if the additional solenoid valve should break down with the valve jammed in the on position, then only the normal circuit can be used and no advantage can be taken of the emergency circuit. Finally, as in the first example, a third circuit is provided for parking, with an electrically-controlled metering valve feeding pressure to the shuttle valves of the emergency circuit.

It should also be specified that the drawbacks mentioned for the three above examples and inherent to upstream selection between the two main circuits of the braking system are aggravated with increasing number of wheels in the landing gear, constituting an even greater handicap in the systems fitted to aircraft of large capacity (often fitted with two wing undercarriage units and two fuselage undercarriage units, giving a total of sixteen wheels).

Mention may also be made of a fourth example using electro-hydraulic control and based on simultaneously activating the normal circuit and the emergency circuit, both of which are then organized identically, with a third circuit still being provided for parking, as in the first and third examples. Such permanent coupling gives rise to a certain amount of inflexibility, particularly with respect to the anti-skid function provided by the servo-valves associated with each brake (the anti-skid order depends on two wheels).

To finish off the state of the art, the document WO-A-91 11352 may also be mentioned which describes electro-hydraulic braking control in which the hydraulic pressure source is doubled-up: the emergency (secondary) circuit takes over automatically for braking purposes if the pressure in the normal (primary) circuit drops beneath a predetermined threshold below the pressure that exists in the emergency circuit. That system is highly redundant since it is necessary to provide two servo-valves per brake (one for the primary circuit and one of the secondary circuit).

Finally, mention may be made of document FR-A-2 038 801 which describes an architecture comprising two independent circuits without selection being possible, and document DE-C-1 118 020 which illustrates a mechanical-hydraulic type system in which the hydraulic source is brought into play automatically without any selection being possible, and it is applied simultaneously to all of the associated actuators (it should be observed that said system does not include any anti-skid valves).

OBJECTS AND SUMMARY OF THE INVENTION

An object of the invention is to propose a braking system that does not have the drawbacks and/or limitations of the systems mentioned above.

The invention thus seeks to provide a braking system whose structure is both simple and reliable (and in particular has a minimum number of servo-valves), and which makes it possible to cope with numerous possible breakdowns without relying solely on the pilot taking appropriate action, and obtaining maximum advantage of the redundancy provided in the braking circuit.

More particularly, the present invention provides an electro-hydraulic braking system for the wheels of aircraft landing gear in which the wheels are distributed in two groups disposed symmetrically on either side of the longitudinal midplane of the aircraft, each wheel being fitted with a brake that is actuated from brake pedals, via an associated braking and anti-skid servo-valve electrically controlled by a control unit that obtains measurement date corresponding to the depression of said pedals and to the speed of the wheel, the system being including two sources of hydraulic pressure, each feeding a corresponding hydraulic circuit leading via braking control stages having two-inlets to the brakes of two groups of wheels, with a first circuit connecting the first inlet of each of the braking control stages, via two shuttle valves each associated with the brakes of one group of wheels either to a first solenoid valve electrically controlled by the control unit or else to a double metering valve that is mechanically controlled by the brake pedals, and with a second circuit directly connecting the second inlet of each of the braking control stages to a second solenoid valve likewise electrically controlled by the control unit, each braking control stage being organized about two symmetrical internal circuits each including one servo-valve per associated brake, said two internal circuits additionally being cross-connected via a respective controlled valve so that in the event of a breakdown in one or other of the two hydraulic circuits, the servo-valves associated with the other hydraulic circuit enable braking and anti-skid control to be performed in a paired tandem mode, with reconfiguration being automatic.

In a first embodiment, the source of hydraulic pressure associated with the first hydraulic circuit is duplicated, having a first source fitted with a hydraulic accumulator for feeding one-half of the double metering valve, and a second source fitted with a third solenoid valve under electrical control of the control unit to feed the other half of said metering valve, said two sources also feeding the first solenoid valve.

In a variant, the source of hydraulic pressure associated with the first hydraulic circuit is a single source simultaneously feeding each half of the double metering valve, and also feeding the first solenoid valve.

Also advantageously, the source of hydraulic pressure associated with the second circuit is fitted with a hydraulic accumulator.

It is also advantageous for the controlled valves to be slide valves biased by respective springs preferably rated to correspond substantially to maximum design pressure.

In which case, when each of the two internal circuits of each braking control stage has a single outlet, the associated controlled valves are single slide valves, and when each of the two internal circuits of each braking control stage has two outlets, the associated controlled valves are double slide valves or pairs of single slide valves.

It is then preferable for the two internal circuits to include respective hydraulic fuses between each of the servo-valves and the associated controlled valves.

Also advantageously, the first and second hydraulic circuits include return lines respectively connected to each of the braking control stages, said return lines being fitted with associated non-return valves. In particular, the return line of the first hydraulic circuit is also fitted with a solenoid valve upstream from the associated non-return valve, the closing of said solenoid valve enabling pressure to be blocked in the brakes so as to hold them in an aircraft parking position.

BRIEF DESCRIPTION OF THE DRAWINGS

Other characteristics and advantages of the invention appear more clearly in the light of the following description of a particular embodiment and given with reference to the accompanying drawings, in which:

FIG. 1 is a block diagram of an electro-hydraulic braking system of the invention shown acting on four wheels;

FIG. 2 shows a braking control stage having four outlets, for acting on four wheels (in which case the aircraft has landing gear with eight or sixteen wheels);

FIG. 3 is a block diagram of a braking system of the invention fitted with four braking control stages of the type shown in FIG. 2, for acting on landing gear having sixteen wheels (only one group of four wheels is shown in the figure);

FIG. 4a is based on FIG. 3 and shows how hydraulic fluid flows in the two circuits, under normal operating conditions of the braking system (the respective paths are represented by solid lines and by dashed lines); and FIGS. 4b to 4f are diagrams analogous to FIG. 4a, but showing various breakdown conditions, showing how braking is controlled under such circumstances using a paired tandem mode and automatic reconfiguration.

MORE DETAILED DESCRIPTION

FIG. 1 shows an electro-hydraulic braking system 100 for a set of four wheels R, comprising two wheels on either side of a longitudinal midplane of an aircraft, each wheel being fitted with a brake F actuated by means of brake pedals 106 (the figure shows brake pedals 106 both for the pilot and for the copilot of the aircraft).

The braking system 100 includes two hydraulic pressure sources 103 and 104 each feeding a respective hydraulic circuit 101, 102 leading via a braking control stages 120 having two inlets to the brakes F of two groups of wheels R. The first circuit 101 feeds a double metering valve 108 of design similar to those used conventionally, i.e. suitable for delivering a hydraulic pressure downstream from its outlet (two outlets in this case) lying in the range 0 to inlet pressure, as a function of a reference given by the pilot. In the diagram of FIG. 1, the double metering valve 108 is shown as a single block, and the letters G and D are used to designate the portions of said member that are associated respectively with wheels on the left and on the right. As shown below, it is naturally possible to implement the double metering valve as two separate metering valves, each allocated to one group of wheels. Downstream from the double metering valve 108, its two outlets lead to respective shuttle valves 110 and 111, each of which valves also receive the inlet pressure from the source 103 of the circuit 101 via a solenoid valve 151 which is under the control of the computer in the control unit 105 (with the corresponding electrical link being represented by a line 114), an associated pressure sensor 112 being likewise connected to the computer. Downstream from the shuttle valves 110 and 111, there are two two-inlet braking control stages 120, in each of which a first inlet 121 is connected to said shuttle valves, and the corresponding outlet 135 of the control stages 120 lead to the brakes F of the wheels concerned. It is important to observe that the double metering valve 108 is controlled mechanically by the brake pedals via associated rodding 109. As shown below, when the aircraft landing gear includes more than four wheels, then there are more than two braking control stages 120, and each first inlet of said stages is then connected to one or other of the two shuttle valves 110 and 111.

The second circuit 102 which is associated with pressure source 104 directly connects a second solenoid valve 152 also under the control of the control unit 105 to the second inlet 122 of each of the braking control stages 120. Here again, if the landing gear includes more than four wheels, the braking system 100 has more than two braking control stages 120, and the second inlet of each of said stages is fed from the second hydraulic source 104 via the solenoid valve 152.

Lines 107 represent the connection between the brake pedals and the control unit 105, recalling that the control unit obtains measurement data corresponding to depression of the pedals 106, in addition to obtaining measurement data representative of the speed of rotation of each wheel for anti-skid purposes.

A fundamental difference compared with existing systems can immediately be seen in that the braking system 100 has two separate sources of hydraulic pressure that act simultaneously, each of these sources feeding an associated hydraulic circuit. There is thus no longer any upstream selection operating either automatically or under pilot control to switch between a normal circuit and an emergency circuit. On the contrary, in the context of the invention, both circuits are designed to act simultaneously, with selection taking place downstream, not upstream, thus making it possible, as described below, to cope with numerous types of breakdown that may occur on a braking circuit, thereby increasing the reliability of braking control.

In the diagram of FIG. 1, the basic structure of each of the two braking control stages 120 (outlined in chain-dotted lines) can be seen, each of said stages being organized to have two essentially symmetrical internal circuits each including a braking and anti-skid servo-valve 123, 124 per associated brake F, said servo-valves being electrically controlled by the control unit 105, as represented by connection 137. Downstream from the servo-valves 123 and 124, there can be seen conventional hydraulic fuses 125, 126 (i.e. quantity limiters that operate like safety valves to allow a predetermined volume to be lost in safety). Thus, there are two main lines 129, 130 respectively associated with each of the hydraulic circuits 101, 102 and leading, downstream from the fuses 125, 126 to respective controlled valves 127, 128 with the control of said valves being represented herein by hydraulic lines 131, 132, each likewise associated with a respective one of the two circuits 101 and 102. Downstream from these control valves 127, 128, each braking control stage 120 terminates via an associated outlet 135, 136 leading to the wheel brakes F. In addition, these two internal circuits are inter-connected as represented by hydraulic lines 133, 134 via the respective controlled valves 127, 128 such that in the event of a breakdown in one or other of the two hydraulic circuits 101, 102, the servo-valves associated with the other hydraulic circuit enable braking and anti-skid control to be achieved in a paired tandem mode, with reconfiguration being automatic. The operation of the system under normal circumstances and under various breakdown circumstances is described in greater detail below.

There now follows a description of the structure of a two-inlet braking control stage 120, and unlike the diagrammatic representation given in FIG. 1, the stage shown has more than two outlets, i.e. each outlet is associated with controlling a plurality of wheel brakes: in particular, a braking control stage is shown that has four outlets, i.e. this stage is associated with braking and anti-skid control in a group of four wheels forming part of a wing undercarriage unit or of a fuselage undercarriage unit. The references 135, 136 have been retained for the outlets from each half of a braking control stage 120, but in this case the references are associated with indices each corresponding to the number of the corresponding wheel. In conventional manner, aircraft landing gear wheels are given increasing numbers from left to right and successively from front to back: using such notation in association with a set of four undercarriage units each having four wheels, the left wing undercarriage unit has wheels numbered 1, 2, 5, and 6, as identified in FIG. 3 which is described below, while the right wing undercarriage unit has wheels numbered 3, 4, 7, and 8, the left fuselage undercarriage unit has wheels numbered 9, 10, 13, and 14, and the right fuselage undercarriage unit has wheels numbered 11, 12, 15, and 16.

In the present example, the braking control stage 120 shown in FIG. 2 is associated with controlling braking of the wheels numbered 1, 2, 5, and 6, which explains why the corresponding outlets are numbered 135.1, 135.6, 136.5, and 136.2. It can be seen that organization is essentially symmetrical relative to a midplane 150, which symmetry presents particular advantages in the event of a loss of electrical power generation in the aircraft, as explained below with reference to FIG. 4f.

The left half of the braking control stage 120 is associated with the first circuit 101, and there can be seen the corresponding inlet 121 feeding two braking and antiskid valves 123.1 and 123.6 that are electrically controlled by the computer of the control unit (the servovalves are numbered using the index belonging to the corresponding wheel, as explained above with reference to the outlets from the stage), followed by two hydraulic fuses 125 each fitted in this case with a bypass 140 having a safety valve, and each of the two corresponding lines 129 reaching a controlled slide valve 127 constituted in this case by a double slide valve, each slide of said slide valve being biased by an associated spring 142 whose rating corresponds preferably substantially to the maximum design pressure. The opposite ends of the slides are subjected to the pressure of the fluid arriving via the inlet 121. Downstream from slide valve 127, there can be seen two outlet branches leading to the outlets 135.1 and 135.6, each of said branches being associated in this case with a corresponding pressure sensor 144 that is connected to the control unit. In the righthand half of the braking control stage 120, the organization is essentially identical and symmetrical to the organization described above, such that downstream from the inlet 122, there are two lines 130 each including a braking and anti-skid valve 124.5 or 124.2, followed by a fuse 126 fitted with a bypass having a safety valve 141, finally reaching a slide valve 128 downstream from which there are the branches leading to the outlets 136.5 and 136.2, at which outlets pressure is measured by means of respective associated sensors 145. The two circuits in this braking control stage 120 are further associated firstly with return lines 131 and 132 leading to corresponding outlets 138 and 139 each associated with two of the internal circuits of said stage, and secondly with cross-connection lines 133 and 134 which are the only lines passing through the middle frontier 150 between the two halves of the control stage.

In normal operation, both inlets 121 and 122 of each braking control stage 120 are fed by the hydraulic sources 103 and 104 of the two circuits 101 and 102. Both slide valves 127 and 128 are urged by the corresponding feed pressure against the force of the associated return spring 142, 143 (as shown in FIG. 2): under such circumstances, the wheels numbered 1 and 6 are braked under the control of respective associated braking and anti-skid servo-valves 123.1 and 123.6, and similarly the wheels numbered 5 and 2 are braked directly under the control of respective associated braking and anti-skid servo-valves 124.5 and 124.2. If the force of the spring 142 overcomes the hydraulic pressure acting on the other end of the slide valve 127, then the slide moves to the right (in FIG. 2), thereby closing the connections between each of the lines 129 and the outlets 135.1 and 135.6, while simultaneously establishing connections between said outlets and the associated cross-connection lines 133 and 134: under such circumstances, braking (and anti-skid control) for the wheel number 1 is controlled by braking servo-valve 142.1 which is associated with the wheel numbered 2, and braking (and anti-skid control) of the wheel numbered 6 is controlled by the braking servo-valve 124.5 associated with braking the wheel numbered 5. Similarly, if the spring 143 overcomes the hydraulic pressure to which the slide valve 128 is subjected (which pressure corresponds to the second circuit 102), then the slide of the valve moves to the left (in FIG. 2) thus interrupting the connection between the lines 130 and the outlets 136.5 and 136.2, while setting up cross-connections between said outlets and the cross-connection lines 133 and 134: under such circumstances, braking (and anti-skid control) of the wheel numbered 5 is controlled by the servo-valve 132.6 associated with braking (and anti-skid control) of the wheel numbered 6, and braking of the wheel numbered 2 is controlled by the servo-valve 123.1 associated with braking (and anti-skid control) of the wheel numbered 1. In this case, the slide valves 127 and 128 are shown as being implemented in the form of two double slide valves, but it would naturally be possible in a variant to replace each double slide valve with a pair of single slide valves.

The system 100 is now described in greater detail with reference to FIG. 3, as applied to controlling the braking of landing gear having sixteen wheels.

In FIG. 3, it can be seen that the hydraulic pressure source associated with the first hydraulic circuit 101 is duplicated, comprising a first source 103.1 for feeding one-half 108.1 of the double metering valve, and a source 103.2 serving to feed the other half 108.2 of said metering valve, which member is structurally duplicated in the present case for right/left allocation purposes. In the present case, the source 103.1 is fitted with a hydraulic accumulator 146, and with two non-return valves 147, and the second source is fitted with one non-return 153 and an additional solenoid valve 148 operating as an on/off valve under the control of the control unit 105 and associated with an actuator 149.

Naturally, in a variant, a single hydraulic pressure source could be provided that simultaneously feeds both halves 108.1 and 108.2 of the double metering valve, and that also feeds the solenoid valve 151, such a single source being represented diagrammatically by dashed feed line 103.3 which then includes an associated non-return valve 165.

The hydraulic pressure source 104 associated with the second circuit 102 is advantageously fitted with a hydraulic accumulator 155, and with a non-return valve 156, disposed upstream from the solenoid valve 152 which is under the control of the control unit 105.

The braking system 100 in this case is fitted with four braking control stages 120, each having the same structure as already described with reference to FIG. 2, and the wheels associated with the left wing undercarriage unit R1, R2, R5, and R6 are shown diagrammatically, while the other wheels of the landing gear are represented merely by the corresponding outlets from the other braking control stages. As before, references 135 and 136 are given to the outlets of each of the other control stages in association with the number of the corresponding wheel, thus, the stages have the following sets of outlets: 135.9, 135.14, 136.13, 136.10; 135.11, 135.16, 136.15, 136.12; and 135.3, 135.8, 136.7, 136.4.

FIG. 3 also shows the return line 157 associated with the circuit 101, together with the return line 158 associated with the second circuit 102. With reference to the structure of the braking control stage 120 shown in FIG. 2, this means that the return outlet 138 associated with the circuit 101 is, for each control stage 120, connected to the return line 157, and the return outlet 139 associated with the second circuit 102 is, for each stage, connected to the associated return line 158. It is advantageous to observe that the return line 157 of the circuit 101 is also fitted with a solenoid valve 159 upstream from a non-return valve 161, the electrical actuator of the valve 159 being referenced 160, while the return line 158 is fitted solely with a non-return valve 162. As described below, with reference to FIG. 4f, the solenoid valve 152 provides an additional advantage in the event of a breakdown, in a parking situation, since this valve makes it possible to block pressure in the valve so as to keep the wheels in the parking position. The operation of the system of the invention is now described in outline, initially in a normal situation with reference to FIG. 4a, and subsequently in various breakdown situations with reference to FIGS. 4b to 4f.

In FIG. 4a, hydraulic fluid from the duplicated source 103.1 and 103.2 of the first circuit 101 passes normally via servo-valve 151 and then via the two shuttle valves 110, 111 to reach the braking control stages 120 at which hydraulic fluid also arrives from the source 104 via the second circuit 102, both circuits being concerned with the braking of the four brakes associated with each of the stages. Under such circumstances, the hydraulic fluid that passes through the shuttle valves 110, 111 is at nominal pressure and the solenoid valves 151, 152 are both controlled simultaneously by the control unit 105 so as to convey hydraulic pressure to the inlets 121 of the braking control stages 120 in such a manner that each brake is individually controlled by the associated braking and anti-skid servo-valve 123.i, 124.j for each wheel brake Ri, Rj, respectively. The shuttle valves 110, 111 are thus in a cable braking position, i.e. braking is under mechanical-hydraulic control.

In FIG. 4b, a first possible breakdown situation can be seen in which the second hydraulic circuit 101 is involved, e.g. its hydraulic source 104 has failed, or else the solenoid valve 152 has stuck in the off position. Under such circumstances, the inlets 122 of each braking control stage 120 are no longer supplied with pressure; consequently, in each of these stages, the slide valve 127 remains displaced under hydraulic pressure from fluid applied via the inlets 121 keeping the slides of the valves 127 in position, whereas the slide valves 128 are displaced under drive from the respective springs 143, thereby setting up a fluid connection with the associated outlets so as to feed them with pressure from the inlet 121 of each of the stages. Under such circumstances, each braking and anti-skid servo-valve 123 in each braking control stage 120 controls two brakes, and the system operates in paired mode under drive from the first circuit 101, and under electrical control. With reference to the set of four wheels shown, the wheels R1 and R2 are controlled by the servo-valve 123.1 of the first braking control stage 120, while the wheels R5 and R6 are controlled by the other servo-valve 123.6 of the same stage.

In FIG. 4c, the assumed breakdown corresponds to the loss of hydraulic pressure in the first circuit 101. Under such circumstances, the source 104 of the second hydraulic circuit 102 acts on its own, and in each braking control stage 120, it is the slide valve 127 that is displaced by the associated spring 142, while the slide valve 128 remains biased by the applied hydraulic pressure. An electrical braking mode is then applied in association with the second circuit 102 only, and the corresponding servo-valves in each braking control stage 120 each control two wheel brakes. In particular, with reference to the four wheels shown diagrammatically in the figure, the wheels R1 and R2 are controlled by the servo-valve 124.2 of the first braking control stage 120, while the wheels R5 and R6 are controlled by the servo-valve 124.5 of the same control stage.

In FIG. 4d, the assumed breakdown corresponds to misfunction of the solenoid valve 151. If the valve 151 does not open normally, then the shuttle valves 110 and 111 receive only the return pressure coming from each of the metering valves 108.1 and 108.2, and as a result the ball in each of the two shuttle valves does not move. The return hydraulic pressure is then applied to the inlets 121 of each of the braking control stages 120. The lefthand halves of each of these stages are thus supplied with pressure, but only a return pressure: if the ratings of the springs of the two slide valves in said stages are such as to correspond to a value close to maximum pressure, then the slider 127 in each of said stages is automatically displaced by thrust from the associated spring 142, while the slide valve 128 of each of said stages remains driven against its return spring by the hydraulic fluid pressure from the second source 104 that continues to feed the second circuit 102 normally. In each of the braking control stages 120, this means that the system returns to braking being controlled in the same manner as that already encountered under the breakdown association described with reference to FIG. 4c. Here again, braking is under electrical control, in paired mode, as determined by the second circuit 102.

The assumption of FIG. 4e corresponds to the same kind of breakdown as above, with the solenoid valve 151 misfunctioning, but in this case the slide valves are of a different structure, and the springs associated therewith are rated differently. In this case, the ball of each shuttle valve 110, 111 is displaced as it was in the case of FIG. 4d, but the two slide valves 127 and 128 in each braking control stage 120 continue to be hydraulically displaced. Electrical braking control is thus applied to pairs of wheels associated with the righthand half of each stage (circuit 102), whereas mechanical-hydraulic type control continues to be applied to the wheels associated with the lefthand half of each stage (circuit 101). It should also be observed that the control unit 105 receives information relating to the pressures associated with the two solenoid valves 151 and 152, thereby giving the pilot the opportunity of manually inhibiting the solenoid valve 152 as though a breakdown had been deliberately applied to the second circuit 102, thereby achieving feed via the double metering valve 108.1, 108.2.

Finally, FIG. 4f shows a breakdown assumption that corresponds to a failure in the electrical power supply of the aircraft. Under such circumstances, the solenoid valves 151 and 152 are in the rest position, i.e. they are closed or "off". The return pressure coming from the metering valves 108.1 and 108.2 acts as before to displace the balls of the shuttle valves 110, 111, and in each braking control stage 120, the slide valve 127 continues to be actuated by the hydraulic pressure arriving via the first circuit 108 while the slide valve 128 is displaced by the associated spring. Here again, braking and anti-skid control is provided in pairs, each servo-valve of the lefthand half in each of the braking control stages serving to provide braking and anti-skid control for two wheels. It should be observed that the symmetrical disposition of the two internal circuits of the braking control stages 120, as shown in FIG. 2, provides an additional advantage insofar as the pilot retains full control over steerability of the aircraft because of balance between braking and anti-skid control provided between left wheels and right wheels.

As mentioned above, the return line 157 of the first circuit 101 is fitted with a solenoid valve 159 upstream from the associated non-return valve 161: when excited, this solenoid valve 159 serves to block the pressure in the brakes so as to hold them in an aircraft-parking position, with the brake pedals naturally being kept in the depressed position. Thus, even in the event of electrical generation being lost, parking braking remains safe and there is no need to provide an additional emergency circuit to cover that situation. Naturally, an additional solenoid valve could be added to the return line 157 of the first circuit 108, which solenoid valve is not shown herein, thereby ensuring that the pressure accumulators are not emptied, with that disposition being conventional.

A braking system is thus achieved whose structure is both simple and reliable (and in particular it has a minimum number of dual function servo-valves, i.e. for controlling braking and for avoiding skid), and which makes it possible to cope with numerous different possible breakdowns without requiring manual intervention by the pilot, thus extracting best possible advantage from the redundancy provided in the braking circuit. The downstream selection performed in the braking control stages thus achieves very significant advantage compared with the prior art techniques in which selection is performed upstream by means of an automatic selector, even if said selector is controllable. Safety is high in that while using two sources, three ways of reaching each brake are provided, and in that automatic reconfiguration is available (by comparing pressures) in a manner that is therefore independent both of the computer and of pilot intervention. Finally, the simplified structure of the system has the side effect of reducing assembly time.

The invention is not limited to the embodiment described above, but on the contrary covers any variant that may use equivalent means to reproduce the essential characteristics specified above.

I claim:

1. An electro-hydraulic braking system for the wheels of an aircraft landing gear in which the wheels are distributed in two groups disposed symmetrically on either side of the longitudinal midplane of the aircraft, each wheel being fitted with a brake that is actuated from brake pedals, via an associated braking and anti-skid servo-valve electrically controlled by a control unit that obtains measurement data corresponding to depression of said pedals and to each speed of the wheel, the system including two sources of hydraulic pressure, each feeding a corresponding hydraulic circuit leading via braking control stages having two inlets to the brakes of two groups of the wheels, with a first circuit connecting the first inlet of each of the braking control stages, via two shuttle valves each associated with the brakes of one group of wheels, either to a first solenoid valve electrically controlled by the control unit or else to a double metering valve that is mechanically controlled by the brake pedals and with a second circuit directly connecting the second inlet of each of the braking control stages to a second solenoid valve likewise electrically controlled by the control unit, each braking control stage being organized about two symmetrical internal circuits each including one said servo-valve per associated brake, said two internal circuits additionally being cross-connected via a respective controlled valve so that in the event of a breakdown in one or the other of the two hydraulic circuits, the servo-valves associated with the other hydraulic circuit enable braking and anti-skid control to be performed in a paired tandem mode, with reconfiguration being automatic.

2. A system according to claim 1, wherein the source of hydraulic pressure associated with the first hydraulic circuit is duplicated, having a first source fitted with a hydraulic accumulator for feeding one-half of the double metering valve, and a second source fitted with a third solenoid valve under electrical control of the control unit to feed the other half of said metering valve, said two sources also feeding the first solenoid valve.

3. A system according to claim 1, wherein the source of hydraulic pressure associated with the first hydraulic circuit is a single source simultaneously feeding each half of the double metering valve, and also feeding the first solenoid valve.

4. A system according to claim 1, wherein the source of hydraulic pressure associated With the second circuit is fitted with a hydraulic accumulator.

5. A system according, to claim 1, wherein the controlled valves are slide valves biased by respective springs preferably rated to correspond substantially to maximum design pressure.

6. A system according to claim 5, in which each of the two internal circuits of each braking control stage each has a single outlet, wherein the respective controlled valves are single slide valves.

7. A system according to claim 6, wherein the two internal circuits include respective hydraulic fuses between each of the servo-valves and the associated controlled valves.

8. A system according to claim 5, in which each of the two internal circuits of each braking control stage each has two outlets, wherein the respective controlled valves are double slide valves or pairs of single slide valves.

9. A system according to claim 1, wherein the first and second hydraulic circuits include return lines respectively connected,to each of the braking control stages, said return lines being fitted with associated non-return valves.

10. A system according to claim 9, wherein the return line of the first hydraulic circuit is also fitted with a third solenoid valve upstream from the associated non-return valve, closing of said third solenoid valve enabling pressure to be blocked in the brakes so as to hold them in an aircraft parking position.

* * * * *